United States Patent [19]
Jang et al.

[11] Patent Number: 5,611,749
[45] Date of Patent: Mar. 18, 1997

[54] ELECTRONIC AND HYDRAULIC CONTROL SYSTEM OF A 4-SPEED AUTOMATIC TRANSMISSION FOR AUTOMOTIVE VEHICLE AND METHOD FOR CONTROLLING HYDRAULIC PRESSURE

[75] Inventors: Jaeduk Jang; Taekyun Kim, both of Kyungki-do, Rep. of Korea

[73] Assignee: Hyundai Motor Company, Rep. of Korea

[21] Appl. No.: 499,061

[22] Filed: Jul. 6, 1995

[30] Foreign Application Priority Data

Jul. 7, 1994 [KR] Rep. of Korea ...................... 94-16312
Jul. 7, 1994 [KR] Rep. of Korea ...................... 94-16314

[51] Int. Cl.$^6$ ................................................. F16H 59/70
[52] U.S. Cl. ............................. 477/65; 74/731.1; 475/65
[58] Field of Search ........................... 74/731.1, 732.1, 74/733.1; 475/64, 65; 477/62, 64, 65

[56] References Cited

U.S. PATENT DOCUMENTS 5,067,603  11/1991  Kato et al. .......................... 477/62 X
5,540,635   7/1996  Jang ........................................ 477/135

*Primary Examiner*—Charles A. Marmor
*Assistant Examiner*—Nathan O. Jensen
*Attorney, Agent, or Firm*—Finnegan, Henderson, Farabow, Garrett & Dunner, L.L.P.

[57] ABSTRACT

Electronic and hydraulic control system of an automatic transmission for automotive vehicle and method for controlling hydraulic pressure whereby line hydraulic pressure can be compensated. A hydraulic pressure state within the electronic and hydraulic control system is precisely detected and the signal of this detected hydraulic pressure is transmitted to a transmission control unit such that the malfunction of the valves and the correct gear shifting stage can be determined. Since the hydraulic pressure state can be detected to be compensated by the control of the TCU, such that the shift quality can be improved.

9 Claims, 12 Drawing Sheets

FIG.10

| MODE | S1 | S2 | S3 | S4 | S5 |
|---|---|---|---|---|---|
| N → D | OFF | ON | DUTY | DUTY | OFF |
| N → R | OFF | ON | DUTY | OFF | OFF |
| 1ST | ON | ON | ON | OFF | OFF |
| 1 → 2 | OFF | ON | DUTY | OFF | OFF |
| 2ND | OFF | ON | OFF | OFF | DUTY |
| 2 → 3 | OFF | OFF | DUTY | OFF | OFF |
| 3TH | OFF | OFF | OFF | OFF | DUTY |
| 3 → 4 | ON | OFF | DUTY | DUTY | OFF |
| 4TH | ON | OFF | OFF | OFF | DUTY |
| 4 → 2 | OFF | ON | OFF | DUTY | OFF |
| 3 → 2 | OFF | ON | DUTY | OFF | OFF |
| 2 → 1 | ON | ON | ON | OFF | OFF |
| REV | OFF | ON | OFF | OFF | OFF |
| L | OFF | ON | OFF | OFF | OFF |

FIG.11
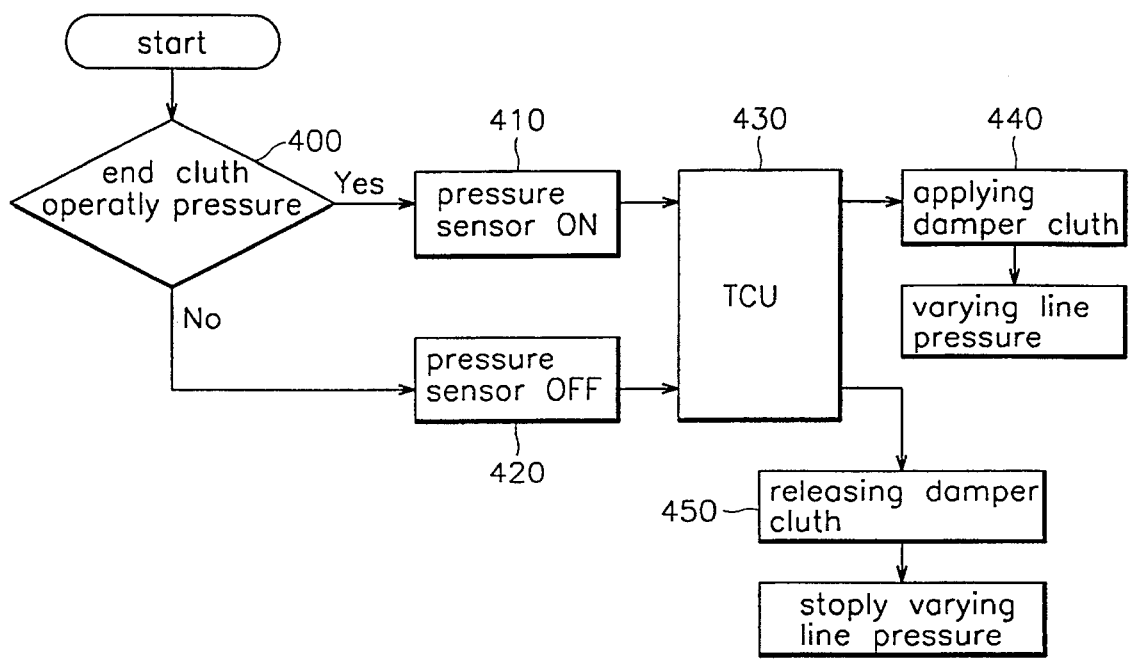
FIG.12
| speed ratio | second pressure sensor | third pressure sensor | fourth pressure sensor | fifth pressure sensor |
|---|---|---|---|---|
| first speed | ON | OFF | OFF | OFF |
| second speed | ON | ON | OFF | OFF |
| third speed | ON | ON | ON | ON |
| fourth speed | OFF | ON | ON | OFF |
| reverse mode | OFF | OFF | OFF | ON |
FIG.13
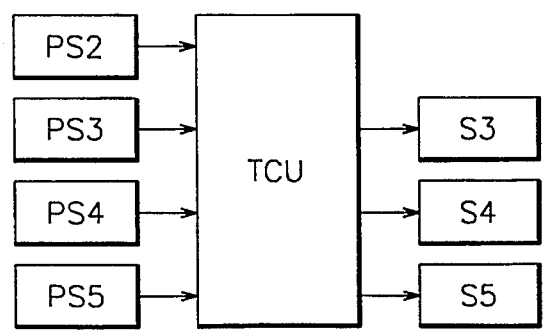

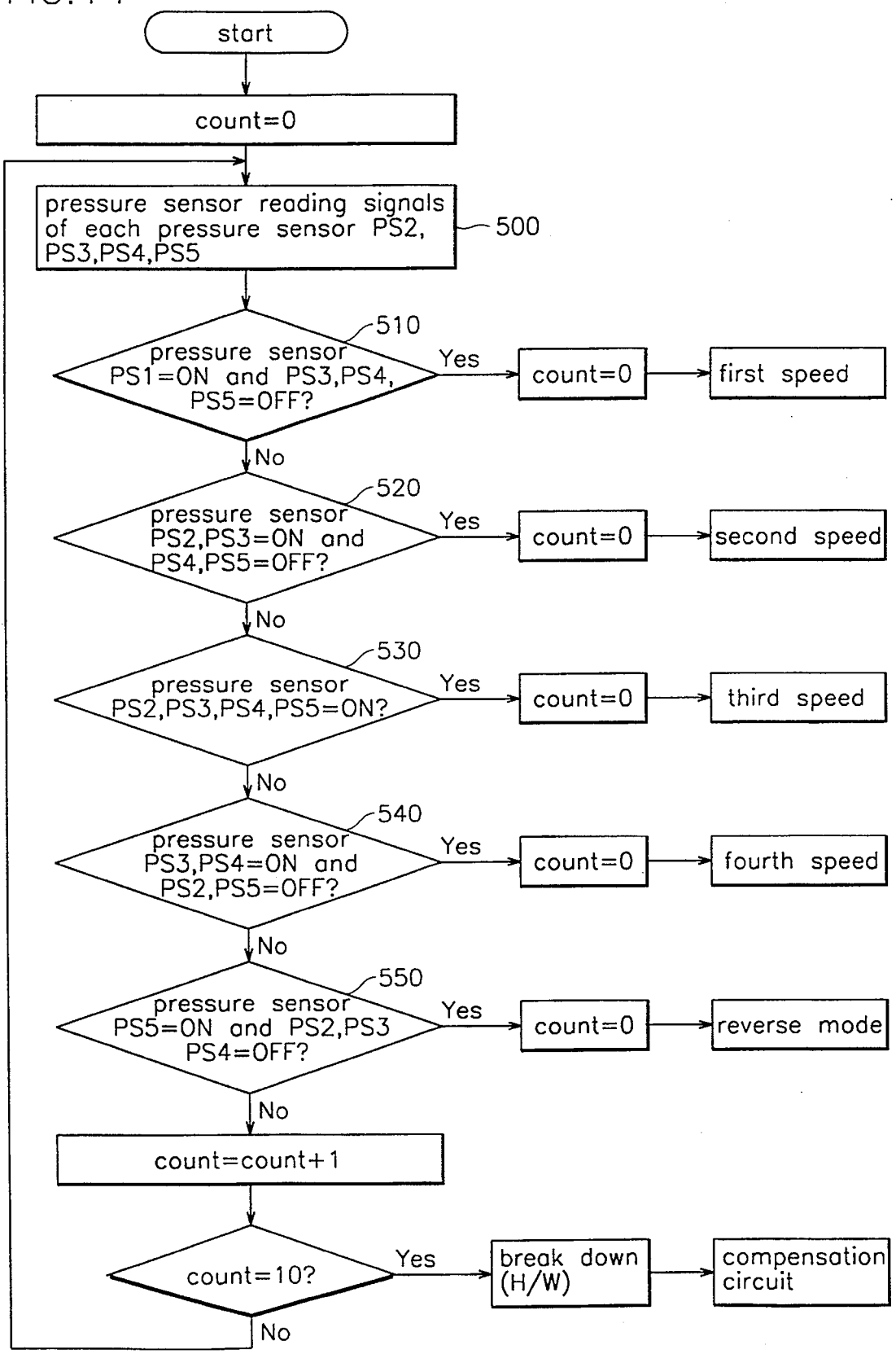

ELECTRONIC AND HYDRAULIC CONTROL SYSTEM OF A 4-SPEED AUTOMATIC TRANSMISSION FOR AUTOMOTIVE VEHICLE AND METHOD FOR CONTROLLING HYDRAULIC PRESSURE

BACKGROUND OF THE INVENTION

1. Field of the Invention

The present invention relates to electronic and hydraulic control system of a 4-speed automatic transmission for an automotive vehicle and a method for controlling hydraulic pressure.

2. Description of Related Art

In general, an automatic transmission provides a necessary gear ratio to operate the vehicle under a wide range of speeds and loads. It does this with a minimum amount of effort on the part of the driver. That is, automatic upshifts and downshifts are a convenience for the driver because a foot-operated clutch is not required to shift gears and because the vehicle can be brought to a stop without the use of a clutch and without shifting the transmission into neutral.

A conventional automatic transmission for a vehicle comprises a torque converter having an impeller, a turbine and a stator, a gear train connected to the torque converter to provide various forward speed ranges and reverse, a plurality of friction members such as disc clutches, one-way clutches which control gear action, and a hydraulic control system for controlling the operation of the friction members. The hydraulic control system includes a plurality of solenoid valves which are controlled by a transmission control unit (TCU).

However, since the hydraulic control system adapted to the conventional 4-speed automatic transmission can not provide a skip shifting, e.g. from the fourth speed to the second speed, responsiveness with respect to a gear shifting is retarded.

Additionally, the system is designed such that only two predetermined modes of pressure, that is, pressure of a drive "D" range and pressure of a reverse "R" range, are fed to the pressure line, thereby causing drive loss of the hydraulic pump and deteriorating the fuel consumption ratio.

Additionally, the torque converter is providing with a damper clutch for directly transmitting power of the engine to the gear train to thereby improve transmission efficiency.

The damper clutch is controlled by a transmission control unit (TCU) receiving a temperature signal of operating pressure, an opening signal of the throttle valve of engine, and a switch signal of the damper clutch brake.

The damper clutch is applied at second, third and fourth speeds of the drive "D" range. The line hydraulic pressure is varied when the damper clutch is applied, thereby increasing transmission efficiency. However, if a minimum line hydraulic pressure cannot be maintained, the friction member gets damaged.

Further, the transmission control unit is designed to output a signal for each speed ratio in accordance with a shift pattern. However, after outputting the signal, the TCU cannot confirm that the friction member is correctly applied. Accordingly, it is impossible that the shift operation is correctly performed.

That is, when hydraulic pressure applied to each friction member is insufficient, shift quality is deteriorated, or friction wear is significant. In the conventional art, since no means for detecting an amount of hydraulic pressure applied to the friction member is provided, the hydraulic pressure cannot be compensated.

SUMMARY OF THE INVENTION

Therefore, it is an object of the present invention to provide an electronic and hydraulic control system of an automatic transmission for a vehicle which can precisely detect hydraulic pressure applied to each friction member such that the signal of this detected hydraulic pressure is transmitted to the TCU so as to determine the malfunction of the valves and the correct gear shifting stage.

It is another object of the present invention to provide an electronic and hydraulic control system that the hydraulic pressure state can be detected to be compensated by the control of the TCU, such that the shift quality can be improved.

It is still another object of the present invention to provide an electronic and hydraulic control system that the skip shift from the fourth to second speed is possible and line hydraulic pressure is variably controlled so that the power performance and responsiveness to the gear shift can be improved.

It is still another object of the present invention to provide an electronic and hydraulic control system that line hydraulic pressure is regularly varied in the third and fourth speeds of the drive "D" range so that overload of the oil pump can be prevented to improve the fuel consumption ratio.

It is still another object of the present invention to provide an electronic and hydraulic control system that when line hydraulic pressure is varied simultaneously with the application of the damper clutch, if the line hydraulic pressure is lower than the reference hydraulic pressure for applying the clutch, the line hydraulic pressure is immediately compensated.

It is still another object that operating pressure applied to each friction member is detected so that application of each friction member is correctly determined.

To achieve the above objects, the present invention provides an electronic and hydraulic control system of an automatic transmission for a vehicle, comprising; a hydraulic pump for pressurizing fluid; a torque converter for transmitting power to the transmission; a pressure regulating valve connected to the hydraulic pump for varying line hydraulic pressure according to an operation of a damper clutch control solenoid valve, the damper clutch control solenoid valve being controlled according to a duty ratio by a transmission control unit; a high-low pressure valve for varying line hydraulic pressure of the pressure regulator valve by using hydraulic pressure fed from the end clutch, the high-low pressure valve being controlled by a duty operation of the damper clutch control solenoid valve at third and fourth speeds of a drive "D" range; a reducing valve connected to the hydraulic pump for reducing hydraulic pressure to be lower than line hydraulic pressure; a manual valve operated by a shift select lever for feeding pressure from the pump to selectively a drive pressure line at the drive "D" range and a reverse pressure line at a reverse "R" range; a shift control valve connected to the drive pressure line for feeding drive pressure to each of two shift control valves by an operation of two shift control solenoid valves which are ON/OFF controlled by the transmission control unit; a rear clutch exhaust valve for feeding pressure from the drive pressure line to a rear clutch at first, second, and third speeds of the drive "D" range; a first pressure control valve controlled by a first pressure control solenoid valve for feeding drive pressure from the drive pressure line to first, second, and third friction members; a second pressure control valve controlled by a second pressure control solenoid valve according to a duty ratio in order to feed hydraulic pressure during shifting the shift select lever from a neutral "N" range to the drive "D" range, a gear shifting from a fourth speed to the third speed, and a gear skip shifting from the fourth speed to the second speed; a first-to-second speed shift valve for feeding hydraulic pressure to third and fifth friction members in accordance with second speed line hydraulic pressure; an end clutch valve for feeding hydraulic pressure to the fourth friction member in accordance with second speed line hydraulic pressure; and a second-to-third/fourth-to-third speed shift valve controlled by third and fourth speed line hydraulic pressures.

In another aspect, the present invention provides a method for controlling hydraulic pressure of an automatic transmission; comprising the steps of: determining if line hydraulic pressure detected by a first pressure sensor is higher than a reference hydraulic pressure at the third and fourth speeds of the drive "D" range; turning "OFF" the first pressure sensor when line hydraulic pressure is lower then the reference hydraulic pressure or turning "ON" the first pressure sensor when the line hydraulic pressure is lower than the reference hydraulic pressure; and applying a damper clutch when an "ON" signal of the first pressure sensor is transmitted to a transmission control unit TCU, thereby variably regulating line hydraulic pressure or releasing the damper clutch when an "OFF" signal of the first pressure sensor is transmitted to the transmission control unit, thereby compensating line hydraulic pressure as a variation of line hydraulic pressure is stopped.

In still another aspect, the present invention provides a method for controlling hydraulic pressure for an automatic transmission, comprising the steps of: (A) reading each signal from pressure sensors PS2, PS3, PS4, and PS5; (B) determining if the pressure sensor PS2 is in an "ON" state and if other pressure sensors PS3, PS4, and PS5 are in "OFF" states; (C) determining if the pressure sensors PS2 and PS3 are in "ON" states and if the pressure sensors PS4 and PS5 are in "OFF" states when the condition of the step (B) is not satisfied; (D) determining if all of the pressure sensors PS2, PS3, PS4, and PS5 are in an "ON" state when the condition of step (C) is not satisfied; (E) determining if the pressure sensors PS3 and PS4 are in "ON" states and if the pressure sensors PS2 and PS5 are in "OFF" states when the condition of step (D) is not satisfied; (F) determining the pressure sensors PS2, PS3, and PS4 are in "OFF" states and if the pressure sensor PS5 is in an "ON" state when the condition of step (E) is not satisfied; and (G) determining that the electronic and hydraulic control system malfunctions when the conditions of the step (F) are not satisfied.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 10 is a table illustrating a combination of frictional members at each speed ratio in the automatic transmission according to the present invention, respectively;

FIG. 11 is a flow chart showing the method for controlling line hydraulic pressure according to the present invention;

FIG. 12 is a table illustrating a combination of pressure switches at each speed ratio in the automatic transmission according to the present invention, respectively;

FIG. 13 is a table diagram for controlling hydraulic pressure at each speed ratio; and FIG. 14 is a flow chart showing the method for controlling hydraulic pressure according to the present invention.

DETAILED DESCRIPTION OF A PREFERRED EMBODIMENT

Figure 1:
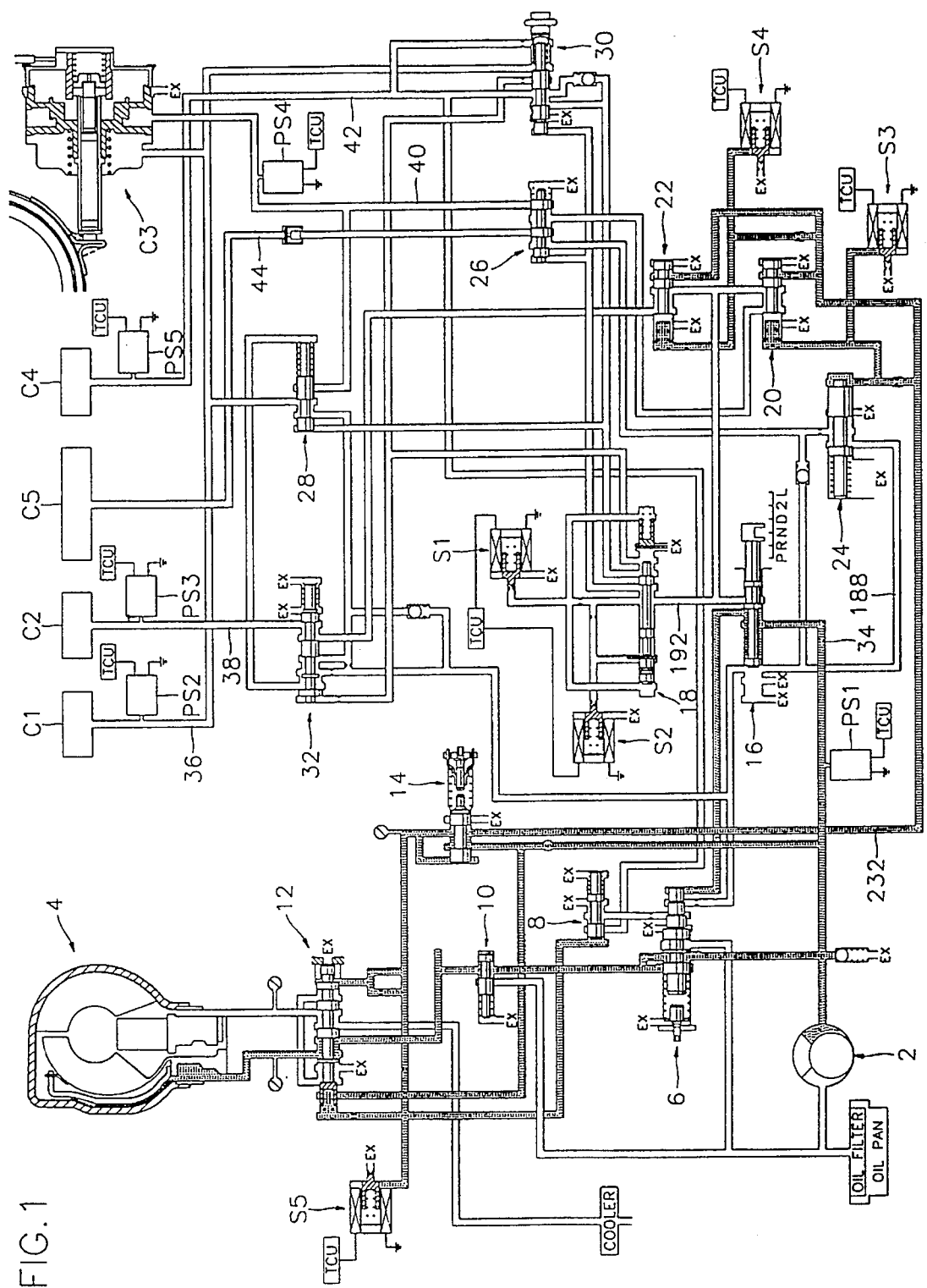
FIG. 1 is a hydraulic circuit diagram of a preferred embodiment of the electronic and hydraulic control system according to the present invention in the neutral "N" range.

A preferred embodiment of the present invention will now be described in detail with reference to the accompanying drawings.

Certain terminology will be used in the following description for convenience and reference only and will not be limiting. The words "right" and "left" will designate directions in the drawings to which reference is made.

As used herein a shift directly from fourth speed ratio to second speed ratio is a skip downshift wherein one speed ratio (i.e. 3rd speed ratio) is skipped.

The Control System Components And Their Interconnection

FIG. 1 shows a electronic and hydraulic control system of an automatic transmission according to a preferred embodiment of the present invention.

The electronic and hydraulic control system comprises a hydraulic pump 2 actuated by drive power of an engine, a torque convertor 4 connecting an engine crankshaft to a transmission input shaft, pressure regulator valve 6 and high-low valve 8 for regulating the hydraulic pressure generated from hydraulic pump 18 as a line hydraulic pressure in response to each shift range, a torque converter control valve 10 for controlling hydraulic pressure for the torque converter 4 and lubrication, and a damper clutch control valve which controls hydraulic pressure applied to a damper clutch mounted within the torque converter 4.

The electronic and hydraulic control system further comprises a reducing valve 14 for reducing hydraulic pressure to be lower than the line hydraulic pressure, a manual valve 16 for supplying the line hydraulic pressure to each valve or exhausting the line hydraulic pressure through an exhaust port in response to a position of the shift selector lever, and a shift control valve 18 controlled by two solenoid valves S1 and S2 to selectively feed the hydraulic pressure in response to each speed ratio.

The electronic and hydraulic control system further comprises pressure control valves 20 and 22 respectively controlled by pressure control solenoid valves S3 and S4 to prevent a shift shock caused by gear shifting and an N-R control valve 24 for preventing a shift shock occurring when the shift selector lever is shifted from a neutral "N" range to a revers "R" range (or a parking "P" range to the reverse "R" range).

The electronic and hydraulic control system further comprises a first-to-second speed shift valve 26 for controlling line hydraulic pressure when the speed ratio changes from a first speed to a second speed and for controlling a hydraulic passage connected to a friction member for reverse when the vehicle is in reverse, a second-to-third/fourth-to-third speed shift valve 28 which is actuated by line hydraulic pressure and supplies apply pressure to first and second friction members C1 and C2 and release pressure to a third friction member C3.

The electronic and hydraulic control system further comprises an end clutch valve 30, a fifth friction member C5 which is applied at low "U" and reverse "R" ranges, and a rear clutch exhaust valve 32 for preventing shock caused by gear shifting from fourth speed ratio to third speed ratio by controlling feeding timing of hydraulic pressure to the second friction member C2.

A first pressure sensor Ps1 is mounted on a line hydraulic pressure line 34 connected to the manual valve 16. The first friction member C1 is connected to the second-to-third speed shift valve 38 and the end clutch valve 30 through a line 36 and communicates with a release chamber of the third friction member C3.

Further, the second friction member C2 is connected with the rear clutch exhaust valve 32 through a line 38 and the third friction member C3 communicates with the first-to-second speed shift valve through a line 40.

The fourth friction member C4 is connected to the end clutch valve 30 through a line 42, and the fifth friction member C5 is connected to the first-to-second speed shift valve 26 through a line 44.

Further, pressure sensors PS2, PS3, PS4, and PS5 are respectively mounted on the lines 36, 38, 40, and 42 connected to each friction member.

The pressure sensors PS1, PS2, PS3, PS4, PS5 are connected to an input end of the transmission control unit TCU to transmit each switching signal thereto.

Figure 2:
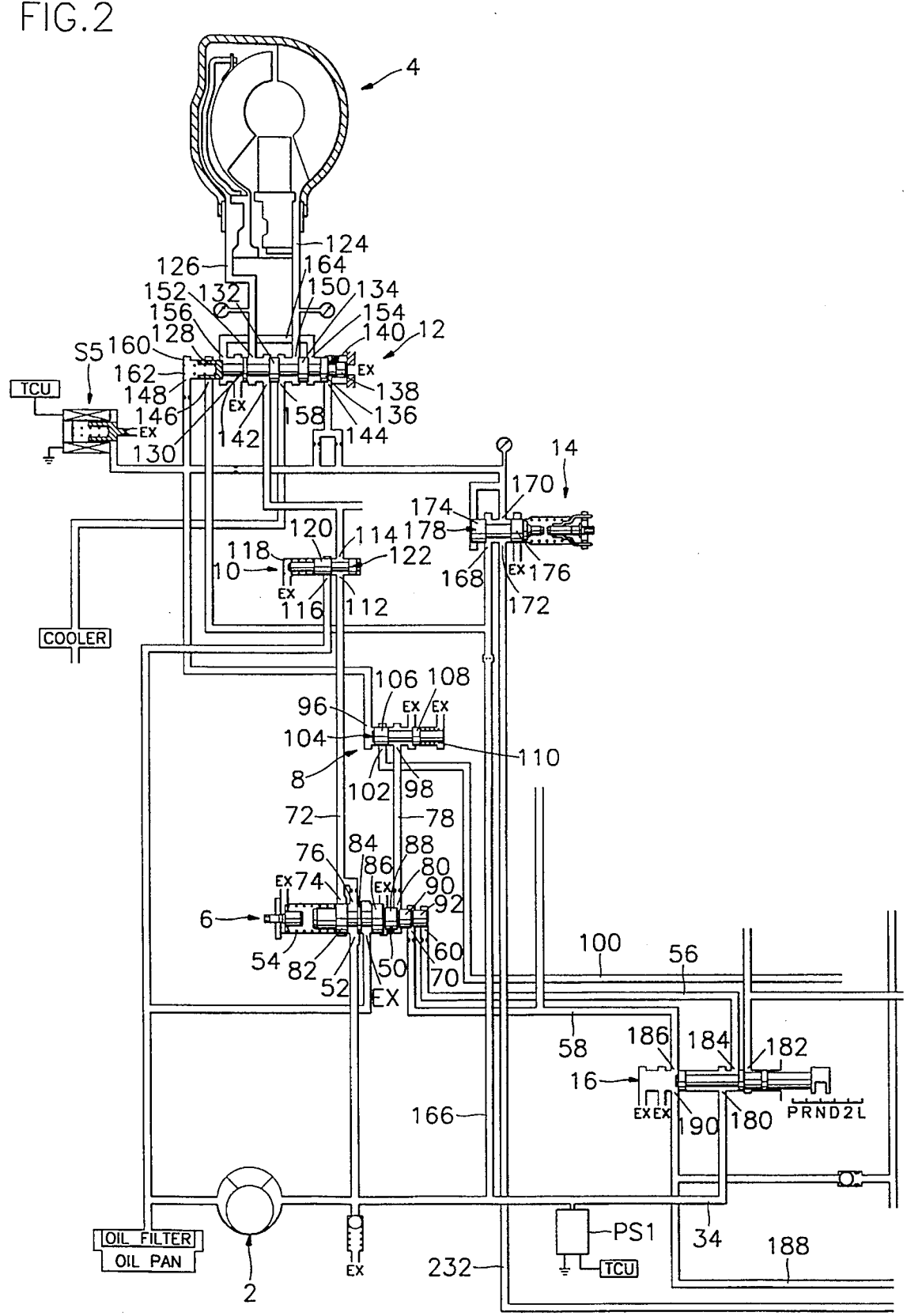
FIG. 2 is an enlarged circuit diagram of the line hydraulic pressure control section and the damper clutch control section of the electronic and hydraulic control system depicted in FIG. 1.

FIG. 2 is an enlarged view of the first-to-second shift valve and the second-to-third speed shift valve, wherein the description of the oil pump 2 and the torque converter 4 is omitted since its structure is the same as that of the conventional art.

The regulator valve 6 for regulating line hydraulic pressure produced from the oil pump 2 is provided with a first port 52 communicating with the line hydraulic pressure line 34, second and third ports 68 and 70 communicating with line hydraulic pressure and reverse pressure lines 64 and 58 to which reaction pressure against a regulator valve spring 54 via the manual valve 16 is fed, fourth and fifth ports 74 and 76 communicating with the first port 52 through a line 72, and a sixth port 80 connected to the high-low valve 8 through a line 78.

The regulator valve 6 has a valve spool 50 disposed therein. The valve spool 50 is biased by a spring 54 and includes a first land 82 for selectively obstructing the fourth port 74, a second land 84 for permitting line hydraulic pressure to be exhausted as the valve spool moves to the left, a third land 86 for separating pump inhalation pressure from pilot pressure, a fourth land on which hydraulic pressure fed through the second port 68 acts, a fifth land 90 on which hydraulic pressure fed through the third port 70 acts, and a sixth land 92 on which hydraulic pressure fed through the second port 68 acts.

Further, the high-low pressure valve 8 connected to the regulator valve 6 via the line 78 is also connected to the damper clutch control solenoid valve S5 via a line 94. The high-low pressure valve 8 is provided with a first port 96 communicating with the line 94, a second port 98 connected to the regulator valve 6, and a third port 102 connected to the end clutch valve 30 through a line 100.

The high-low pressure valve 8 has a valve spool 104 therein. The valve spool 104 includes a first land 106 for selectively opening and closing the third port 102 and a second land 108 for selectively opening and closing an exhaust port Ex. The second land is biased by a spring 110.

The torque converter control valve 12 disposed on the line 72 connecting the regulator valve 6 with the damper clutch control valve 12 is provided with first, second, and third ports 112, 114, and 116, and has a valve spool 122 including a land 120 biased by a spring 118.

Further, the damper clutch control valve 12 is connected to a torque converter 4 through a clutch apply line 124 and a clutch release line 126 to selectively apply the damper clutch.

The damper clutch control valve 12 includes a valve spool 140 having first, second, third, fourth, fifth, and sixth lands 128, 130, 132, 134, 136, and 138, and is provided with first to ninth ports 142, 144, 146 . . . , and 158. A left pressure chamber 160 of the first land 128 is biased by a spring 162 to maintain its rightwarded state.

The first port 128 is supplied with line hydraulic pressure through the line 72 connected with the regulator valve 6 and the second port 144 is supplied with hydraulic pressure reduced at the reducing valve 16.

Further, the seventh port 156 communicates with the eighth port 158 through the line 164. The fifth port 150 is connected to the torque converter 4 through the clutch apply line 124 and the sixth port 152 communicates with the torque converter through the clutch release line 126.

Further, the reducing valve 16 is connected with a branch line 166 of the line hydraulic pressure line 34 to feed reduced hydraulic pressure to the damper clutch control valve 12 and the damper clutch control solenoid valve S5. The reducing valve 16 is provided with a first port 168 communicating with the branch line 166, second and third ports 170 and 172 for feeding a portion of the hydraulic pressure fed through the first port 168 to the damper clutch control valve 12 and the pressure control valves 20 and 22. The reducing valve includes a valve spool 178 having first and second ports 174 and 176 for varying the opening areas of each port.

The manual valve 16 is provided with a first port 180, a second port for feeding hydraulic pressure coming through the first port 180 to the shift control valve 18 at drive "D" second "2" and low "L" ranges, a third port 184 for supplying hydraulic pressure to the regulator valve 6 through the line 56 at the neutral "N" drive "D" second "2" and low "L" ranges, a fourth port 186 for feeding hydraulic pressure to the regulator valve 6 and the rear clutch exhaust valve 32 through the line 58 at the reverse "R" range, and a fifth port 188 for supplying hydraulic pressure to the N-R control valve 24 when the shift selector lever is shifted from the neutral "N" range to the reverse "R" range.

Figure 3:
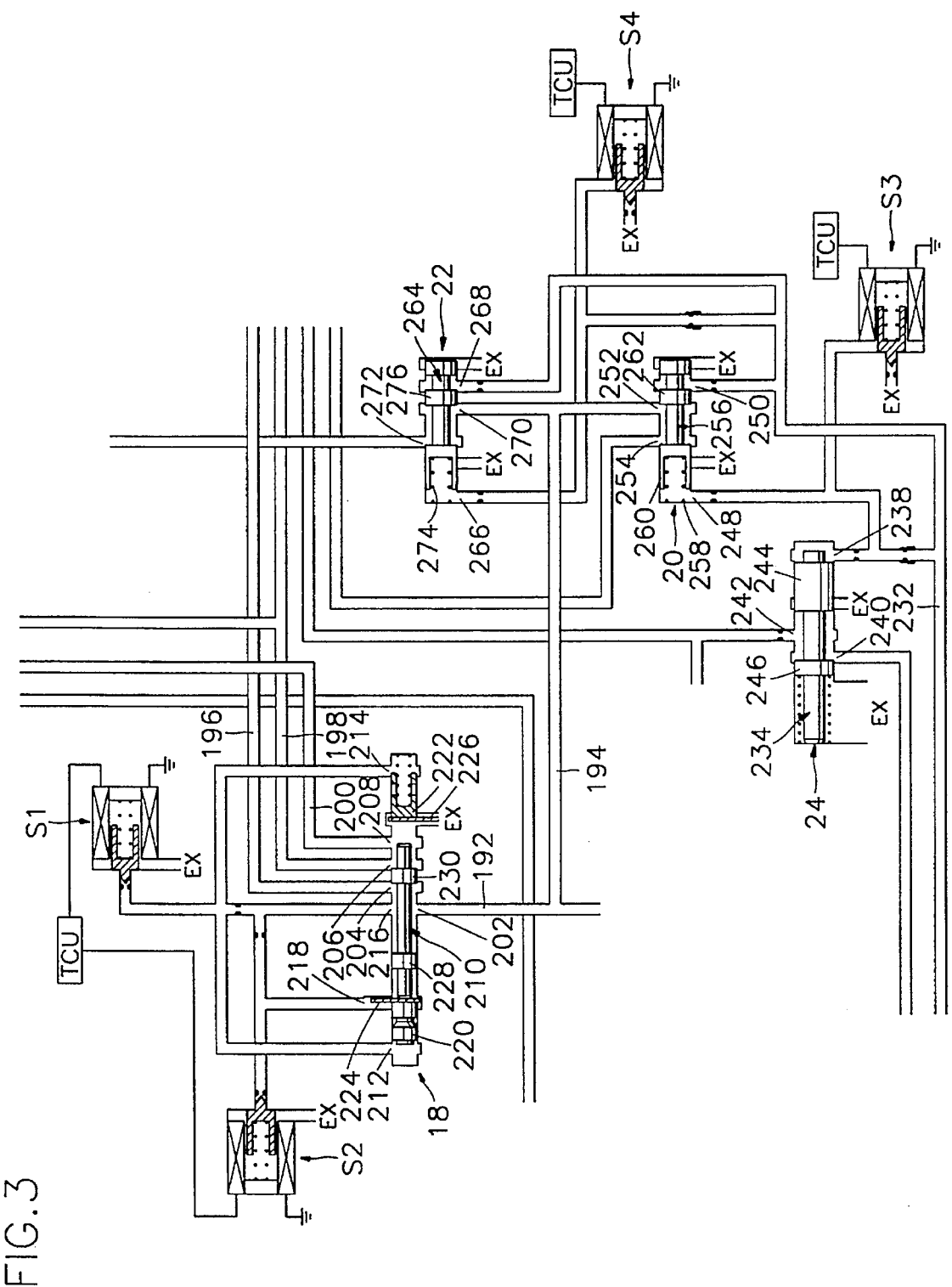
FIG. 3 is an enlarged circuit diagram of the first shift control section of the electronic and hydraulic control system depicted in FIG. 1.

FIG. 3 shows a first shift control part of the electronic and hydraulic control system according to the preferred embodiment of the present invention. Hydraulic pressure flowing along a drive pressure line 192 connecting the manual valve 16 to the shift control valve 18 is selectively supplied to the friction members according to ON/OFF operation of the shift control solenoid valves S1 and S2 which are ON/OFF controlled by the transmission control unit.

To selectively apply the friction members, in this embodiment, the drive pressure line 192 is directly connected with a first speed line 194, and the shift control valve 18 is connected to each second, third, and fourth speed lines 196, 198, and 200.

The shift control valve 18 is provided with a first port 202 communicating with the drive pressure line 192, a second port 204 connected to the second speed line 196, a third port 206 connected to the third speed line 198, a fourth port 208 connected to the fourth speed line 200, and fifth and sixth ports 212 and 214 for supplying hydraulic pressure coming through the first port 202 to left and right sides of a valve spool 210 in accordance with the operation of the shift control solenoid valves S1 and S2, thereby moving the valve spool 210 to the left and right.

The fifth and sixth ports 212 and 214 have a connection which can be supplied with hydraulic pressure from a seventh port 216 and the seventh port 216 is designed to feed hydraulic pressure to an eighth port 218 to move the valve spool 210.

Plugs 220 and 222 are respectively provided to the fifth and sixth ports 212 and 214 and move to the left and right in accordance with the ON/OFF operation of each solenoid valve S1 and S2.

Moving distance of the plugs 220 and 222 are respectively restricted by stoppers 224 and 226 which are respectively provided to the eight port 218 and exhaust port Ex.

Each stopper 224 and 226 is provided with an aperture through which the left and right ends of the valve spool 210 can pass, respectively.

The valve spool 210 has a first land 228 and a second land 230 smaller than the first land 228. The second land 230 selectively obstructs the second, third, and fourth ports 204, 206, and 208.

The N-R control valve connected to the reducing line 232 to receive hydraulic pressure therefrom is for reducing shift shock by gradually increasing hydraulic pressure which is supplied to the friction member for reverse. The valve spool 234 of the N-R control valve 24 moves towards the left and right in accordance with the duty control of the first pressure control solenoid valve S3.

The left end of the valve spool 234 is biased by a spring 236 to maintain its rightwarded state. The N-R control valve 24 is provided with a first port 238 connected to the reducing line 232 to receive hydraulic pressure controlled by the first pressure control solenoid valve S3, a second port connected to the fifth port 190 of the manual valve 16 to receive line hydraulic pressure therefrom, and a third port 242 for feeding hydraulic pressure coming through the second port 240 to the first-to-second speed shift valve 26.

The valve spool 234 includes a first land 244 on which hydraulic pressure coming through the first port 238 acts and a second land 240 for selectively obstructing the second port 240.

Further, the reducing line 232 is connected to first and second ports 248 and 250 of the first pressure control valve 20 via each branch line thereof, in which hydraulic pressure at the first port 248 is controlled by the first pressure control solenoid valve S3.

Further, the first pressure control valve 20 is further provided with a third port connected to the drive pressure line 194 and a fourth port for supplying hydraulic pressure coming through the third port 252 to the first-to-second speed shift valve 26.

The first pressure control valve 20 includes a valve spool 256 biased by a spring 258 and having a first land on which hydraulic pressure flowing into the first port 248 acts and a second land 262 on which hydraulic pressure flowing into the second port 250 acts.

The line connected to the second port 250 is provided with a second pressure control solenoid valve S4 which controls a valve spool 264 of the second pressure control valve 22.

Hydraulic pressure which is controlled by the second pressure control solenoid valve S4 is fed to the first port 266 and hydraulic pressure which is not controlled by the second pressure control solenoid valve S4 is fed to the second port 268.

Further, the second pressure control valve 22 is further provided with a third port 270 connected to the first speed line of the shift control valve 18 to receive hydraulic pressure and a fourth port for feeding hydraulic pressure fed through the third port 270 to the rear clutch exhaust valve 32.

The valve spool 264 of the pressure control valve 22 is biased by a spring 274 and includes a first land on which hydraulic pressure fed through the first port 266 acts and a second land 276 on which hydraulic pressure fed through the second port acts.

Figure 4:
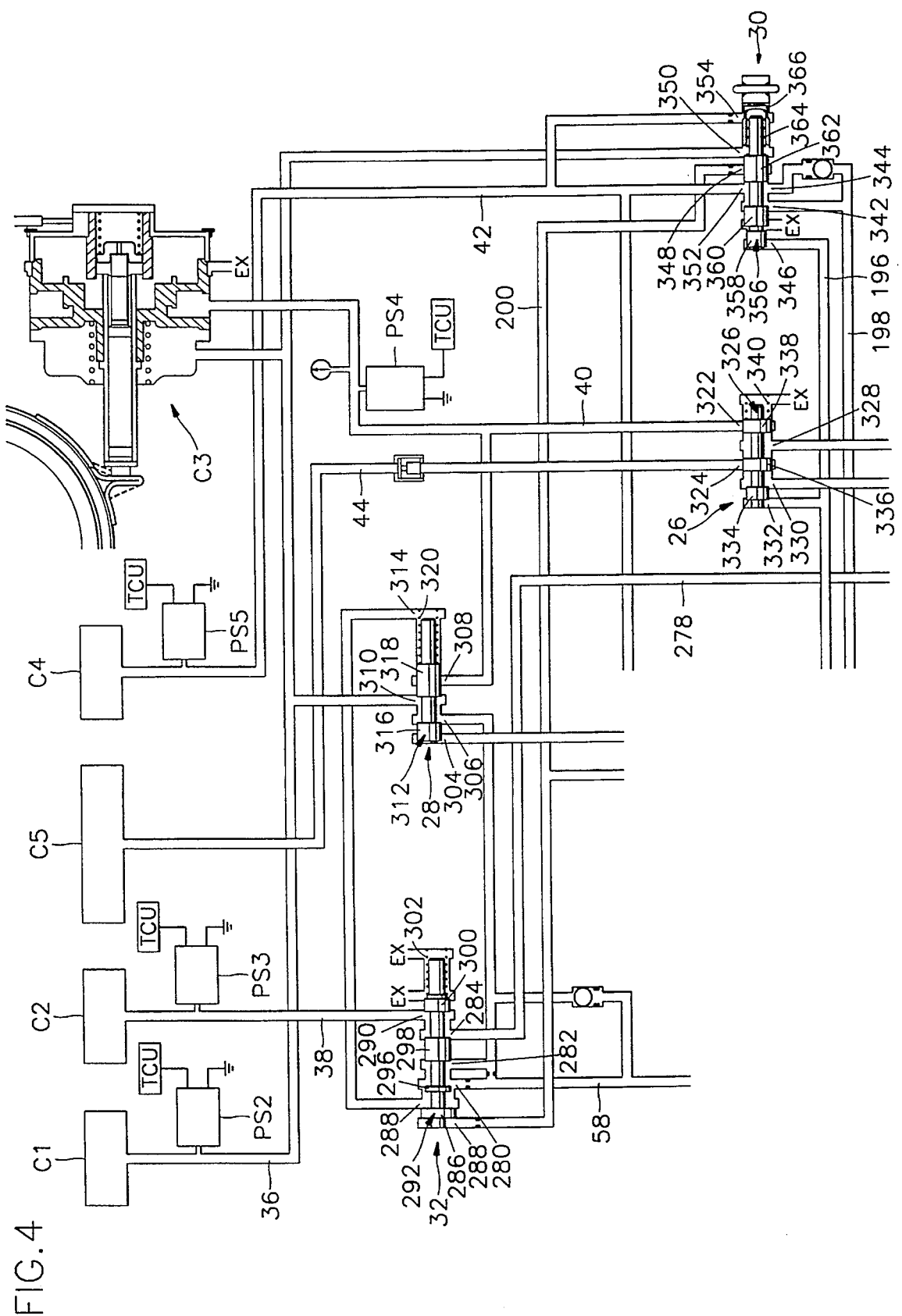
FIG. 4 is an enlarged circuit diagram of the second shift control section of the electronic and hydraulic control system depicted in FIG. 1.

FIG. 4 shows a second shift control part of the electronic and hydraulic control system according to the present invention.

The rear clutch exhaust valve 32 is connected to the fourth port 272 of the first pressure control valve 22 to apply the second friction member C2 at the first speed of the drive "D" range. The first-to-second speed shift valve 26 feeds drive pressure to the second and third friction members C2 and C3 at the second speed of the drive "D" range by being controlled by hydraulic pressure within the second speed line 196 of the shift control valve 18, thereby applying the second and third friction members C2 and C3.

Further, at the third speed of drive "D" range, to apply the fourth friction member C4 in addition to the second and third friction members C2 and C3 which has been applied at the second speed, the second-to-third/fourth-to-third speed shift valve 28 is controlled by hydraulic pressure within the third speed line 198.

At the fourth speed of drive "D" range, to apply only the third and fourth friction members C3 and C4, the rear clutch exhaust valve 32 is controlled by hydraulic pressure within the fourth speed line 200 to obstruct hydraulic pressure which is supplied to the second friction member C2.

As shown in FIG. 4, the rear clutch exhaust valve 32 is provided with first and second ports 280 and 282 for receiving hydraulic pressure from the manual valve through the reverse pressure line 58 at the reverse "R" range, third port 284 communicating with the second pressure control valve 20, a fourth port 286 communicating with the fourth speed line of the shift control valve 18, a fifth port 288 for controlling the second-to-third/fourth-to-third speed shift valve 28, and a sixth port 290 communicating with the second friction member C2.

The rear clutch exhaust valve 32 includes a valve spool having a first land, and second, third and fourth lands 296, 298 and 300 smaller than the first land 294.

The second-to-third/fourth-to-third speed shift valve 28 is provided with a first port 304 communicating with the third speed line 198 of the shift control valve 18, a second port 306 connected to the first and second ports 280 and 282 of the rear clutch exhaust valve 32, and a third port 308 for receiving hydraulic pressure from the first-to-second speed shift valve 26.

The second-to-third/fourth-to-third speed shift valve 28 is further provided with a fourth port 310 for applying the first friction member C2 and releasing the third friction member C3 at the third speed of the drive "D" range and a fifth port connected to the fifth port 288 of the rear clutch exhaust valve 32 to release the first friction member C1 at the first speed of the drive "D" range.

The valve spool 312 biased by a spring 320 includes a first land 316 on which hydraulic pressure within the third speed line 198 acts and a second land 318 for opening and closing the third port 308.

The first-to-second speed shift valve 26 is provided with a first port 322 for supplying hydraulic pressure to the apply chamber of the third friction member C3 at the second and third speeds of the drive "D" range and a second port 324 for supplying hydraulic pressure to the fifth friction member C5 at the reverse "R" range.

The first-to-second speed shift valve 26 is provided with a third port 328 communicating with the fourth port 254 of the first pressure control valve 20 in accordance with a position of the valve spool 326, a fourth port 330 communicating with the third port 242 of the N-R control valve 24, and a fifth port 332 connected to the second speed line 196.

The valve spool 326 includes a first land 334 on which hydraulic pressure fed through the fifth port 332 acts, a second land 336 for selectively opening and closing the second and fourth ports 324 and 330, and a third land 338 for selectively opening and closing the first and third ports 322 and 328.

The valve spool 326 is biased by a spring 340 at its left end and designed to move towards the left at the first speed of the drive "D" range.

Further, the end clutch valve 30 is provided with a first port for receiving hydraulic pressure from the third speed line 198 of the shift control valve 18, a second port 344 for receiving hydraulic pressure from the second speed line 196 of the shift control valve 18, a third port 346, a fourth port 348 connected to the fourth speed line 200, a fifth port 350 connected to the fourth port 310 of the second-to-third/fourth-to-third speed shift valve 28, a sixth port 352 connected to the first friction member C1, and a seventh port 354 connected to the third friction member C3.

The end clutch valve 30 includes a valve spool 356 having a first land 358 on which hydraulic pressure fed through the third port 346 of the valve spool 356 acts, a second land 360 for selectively obstructing the first port 342, and a third land, on which hydraulic pressure fed through fifth port 350 acts to selectively obstruct the fourth port 348.

The valve spool 356 is biased by a spring 364 on its left end to elastically contact a plug 366 on which hydraulic pressure fed through the fifth and seventh ports 350 and 354 acts.

Further, The line 42 communicating with the sixth port 352 is connected to the high-low valve 8 via the line 100.

Operation of the Electronic and Hydraulic Control System

In the electronic and hydraulic control system according to the present invention, the transmission control unit (TCU) controls the solenoid valves to ON/OFF states or according to a duty ratio based upon the throttle valve position and the vehicle road speed. IN turn, the solenoids control fluid pressure through the various valves and ultimately to the friction members to operate the gear shifting.

First, when the torque converter is driven by the engine to rotate the input shaft of the transmission, the hydraulic pump 2 starts to produce the hydraulic pressure.

A portion of the hydraulic pressure produced by the hydraulic pump 2 is directed to the regulator valve 6, the torque convertor control valve 10, and damper clutch control valves 12 along the line hydraulic pressure line 34, and another portion of the hydraulic pressure flows to the reducing and manual valves 14 and 16.

The hydraulic pressure fed to the regulator valve 6 is directed to the torque convertor control valve 10 through the first and fifth ports 52 and 76 and, at the same time, pushes the valve spool 50 of the torque convertor control valve 10 to return a portion of the hydraulic pressure to an oil pan (not shown) through the exhaust port Ex.

At this point, since the hydraulic pressure supplied through the first port 168 pushes the valve spool 178 to change the opening areas of each port, hydraulic pressure lower than the line hydraulic pressure is fed to the damper clutch control, high-low pressure, first pressure control, second pressure control, and N-R control valves 12, 8, 20, 22 and 24 through the second and third ports 170 and 172.

First Speed Operation of the Drive "D" Range

Figure 5:
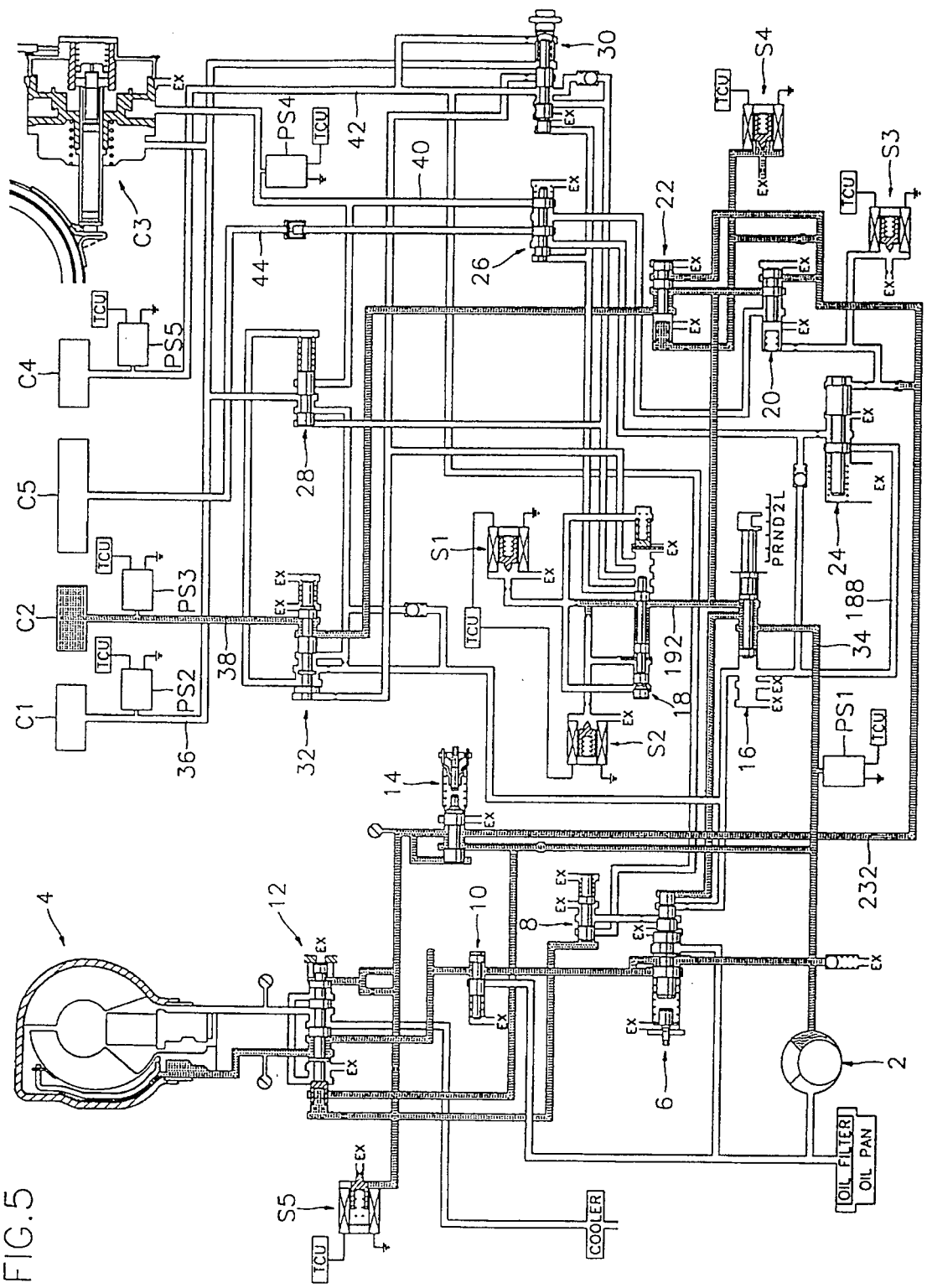
FIG. 5 is the hydraulic circuit diagram of FIG. 1 showing the operation of the electronic and hydraulic control system during the first speed of the "D" range.

When the vehicle operator selects the drive "D" range of the shift lever, the manual valve 12 interconnected with the shift lever is changed from a state shown in shown in FIG. 1 to that shown in FIG. In FIG. 5, and also in FIGS. 6–9 described further herein, the shaded areas of the fluid lines represent lines in which fluid is flowing during the particular operation depicted by the circuit diagram. As shown in FIG. 5, hydraulic pressure coming through the first port 180 and leaving through the second port 182 of the manual valve 12 is directed via the drive pressure line 192 to first port 202 of the shift control valve 18, third port 252 of the first pressure control valve 20, and the third port 270 of the second pressure control valve 22.

Some hydraulic pressure leaves through the third port 184 of the manual valve 16 is directed to the second port 60 of the regulator valve 6 to exert force on the right face of the sixth land 92, thereby forcing valve spool to the left.

At this point, the transmission control unit (TCU) controls the first and second shift control solenoid valves S1 and S2, the second shift control, and the first pressure control solenoid valve S3 to "ON" states and the second pressure control solenoid valve S4 and the damper clutch control solenoid valve S4 to an "OFF" states.

The five solenoid valves are controlled in order to apply only second friction member C2 among the plurality of the friction members to perform the first speed of the drive "D" range. The hydraulic pressure feeding process to the second friction member C2 will now be explained with reference to FIG. 5.

Hydraulic pressure regulated as required for gear shifting by the regulator valve 6 is directed to the drive pressure line 192 via the manual valve 16. At this point, because both first and second shift control solenoid valves S1 and S2 are controlled to "ON" states, hydraulic pressure coming through the first port 202 is exhausted with establishing pressure in the fifth, sixth, and eighth ports 212, 214, and 218.

Accordingly, the valve spool 210 is displaced toward the left until it is stopped by the stopper 224. The second land 228 is then positioned between the second port 204 and the seventh port 216.

As a result, drive pressure cannot be fed to the second, third, and fourth speed line 196, 198, and 200, but to the third port 284 of the rear clutch exhaust valve 32 via the second pressure control valve 22.

At this point, since no hydraulic pressure is fed to the other ports of the rear clutch exhaust valve 32, the valve spool 224 of the rear clutch exhaust valve 32 is displaced towards the left by the spring 302.

Because the third land 298 of the valve spool 224 is located to the left of the third port 112, and the fourth land 300 is displaced to the right of the sixth port 290, hydraulic pressure passing through the drive pressure line 192 is directed through the third and sixth ports 284 and 290 to the second friction member C2 to apply the second friction member C2, thereby carrying out the first speed of the drive "D" range.

During this first speed of the drive "D" range, because the first pressure control solenoid valve S3 is controlled to an "ON" state, hydraulic pressure coming through the first port 248 is exhausted and hydraulic pressure coming through the second port acts on the right face of the second land 262. The valve spool 168 is displaced towards causing second land 262 to obstruct the third port 252 such that hydraulic pressure coming to third port 252 stops there.

Also, since the second pressure control solenoid valve S4 is controlled to an "OFF" state, the valve spool 264 of the second pressure control valve 22 is displaced towards the right under the action of the force exerted by spring and hydraulic pressure coming through the first port 180.

Second Speed Operation of the "D" Range

As the vehicle speed and the throttle opening increase, the TCU starts to control the first shift control solenoid valve S1 to an "OFF" state and the first pressure control solenoid valve S3 according to a duty ratio, as charted in FIG. 10 as the "1-2" operation mode.

Figure 6:
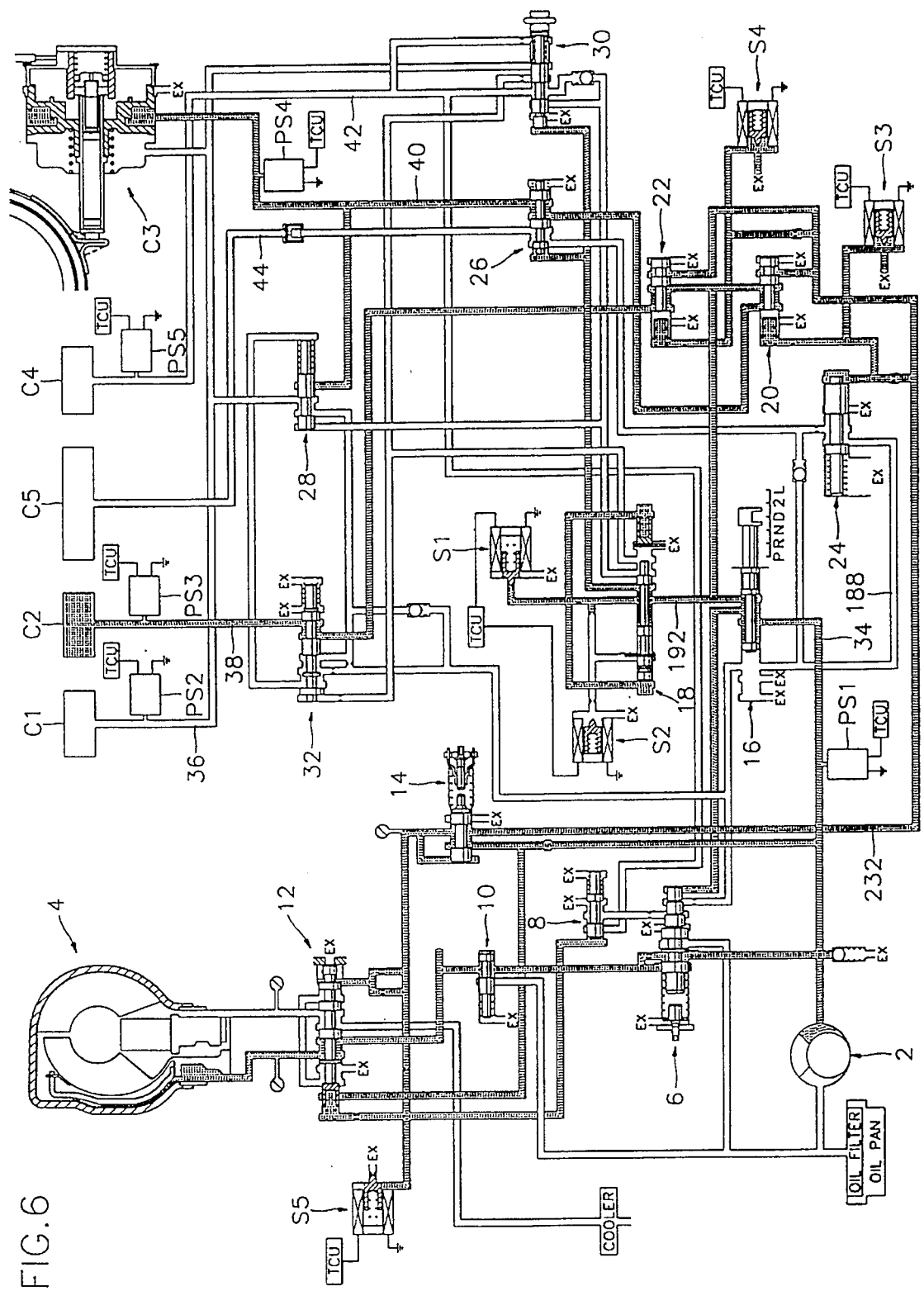
FIG. 6 is the hydraulic circuit diagram of FIG. 1 showing the operation of the electronic and hydraulic control system during the second speed of the "D" range.
Figure 7:
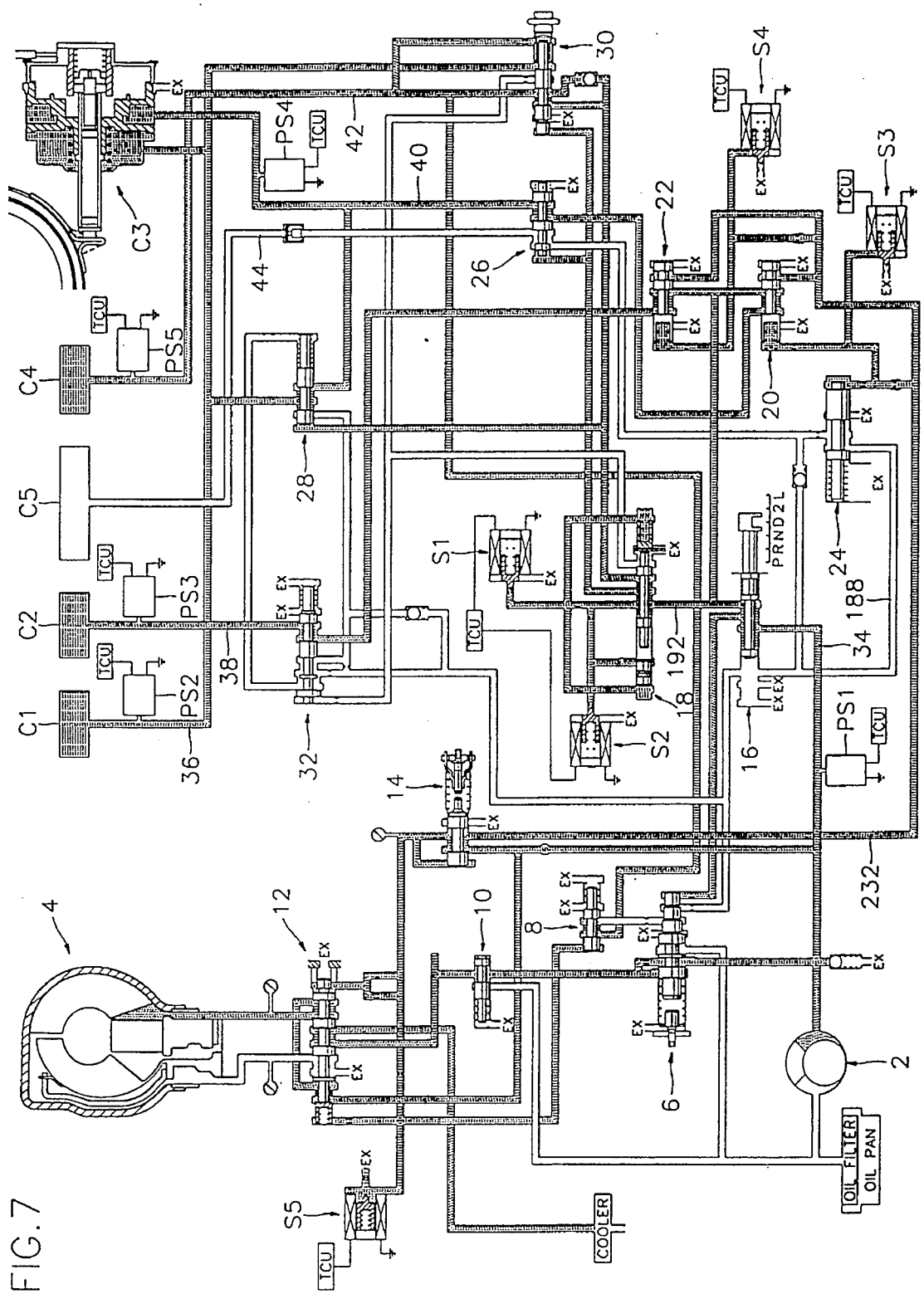
FIG. 7 is the hydraulic circuit diagram of FIG. 1 showing the operation of the electronic and hydraulic control system during the third speed of the "D" range.

This control operates to shift from the first to the second speed and performs the second speed of the "D" range. As shift control solenoid valve S2 is controlled to an "OFF" state, hydraulic pressure established at fifth and sixth ports 212 and 214 of the shift control valve 18 exerts forces to displace plugs 220 and 222 to the positions limited by the stoppers 224 and 226, respectively, as shown in FIG. 6.

Accordingly, valve spool 210 is slightly displaced towards the right so that the second land 230 becomes located between the second port 204 and the third port 206. The first port 202 then communicates with the second speed line 108 to feed pressure to second speed line 194.

As a result, some of the hydraulic pressure flowing through the drive pressure line 192 is fed via the second speed line 194 to the fifth port 332 of the first-to-second speed shift valve 26 and to third port 346 of the end clutch valve 30 to exert forces on the valve spools 268 and 294, respectively.

That is, hydraulic pressure coming through the fifth port 332 of the first-to-second shift valve 26 exerts force on the left face of the first land 334 to displace the valve spool 326 towards the right. Hydraulic pressure coming through third port 346 of the end clutch valve 30 exerts force on the left face of the first land 358 to displace valve spool 294 towards the right.

Since the first pressure control solenoid valve S3 is controlled according to a duty ratio from an "ON" state to an "OFF" state, hydraulic pressure coming through first port 248 of the first pressure control valve 20 increases gradually to displace the valve spool 256 towards the right.

Accordingly, the third port 252 communicates with the fourth port 254 and hydraulic pressure in the drive pressure line 192 is fed to the third port 328 of the first-to-second speed shift control valve 26.

Since the valve spool 326 of the first-to-second speed shift control valve 26 is displaced towards the right, third port 328 and the first port 322 are in communication with each other such that drive pressure is fed to the third friction member C3 to apply the third friction member C3.

Performance of the second speed is accomplished because the second friction member C2 has been applied since the first speed, and first pressure control solenoid valve S3, which has been controlled by the TCU according to a duty ratio, is turned to an "OFF" state.

Third Speed Operation of the "D" Range

As the vehicle speed and the throttle valve opening of engine increase further, the TCU starts to control the second shift control solenoid valve S2 to an "OFF" state and the first pressure control solenoid valves S3 according to duty ratios, as charted in FIG. 10 as the "2-3" operation mode. This control operates to the shift from the second to the third speed.

Since the shift control solenoid valves S1 and S2 are in "OFF" states, hydraulic pressure is established at the fifth, sixth and eighth ports 212, 214, and 218 of the shift control valve 18. The valve spool 210 is displaced to a position where it contacts plug 224 by hydraulic pressure exerting force on the left face of the first land 228.

As a result, the second land 230 of the valve spool 210 becomes located between the third port 206 and the fourth port 208 to enable the second speed line 194 and the third speed line 196 to communicated with first port 202.

As in second speed operation, drive pressure coming through first port 202 of the shift control valve 18 is fed via second speed line 194 to the first-to-second shift control valve 26 and the end clutch valve 30. Because hydraulic pressure from the third speed line 196 is fed to the first port 303 of the second-to-third/fourth-to-third speed shift control valve 28, the valve spool 312 is displace towards the right and the third and fourth ports 308 and 310 communicate with each other. As such, some of hydraulic pressure in the third speed line 196 is directed via the third and fourth ports 308 and 310 to the first friction member C1, the release chamber of the third friction member C3, and the fifth port 350 of the end clutch valve 30.

Accordingly, hydraulic pressure directed to the end clutch valve 30 causes the right and left of the valve spool 356 of the end clutch valve 30 to be subjected to a same pressure. The valve spool 356 is then displaced towards the left because the first land 356 is smaller than third land 304. As a result, the first and fifth ports 342 and 352 communicate with each other to thereby apply the fourth friction member C4.

At this point, since hydraulic pressure has been fed to the second friction member C2 to apply thereof, thereby accomplishing the third speed.

Further, this third speed state is used as an emergency mode when the TCU or electronic circuitry is malfunctioning since the first and second shift control solenoid valves S1 and S2 are controlled to the "OFF" states.

Fourth Speed Operation of the "D" Range

Figure 8:
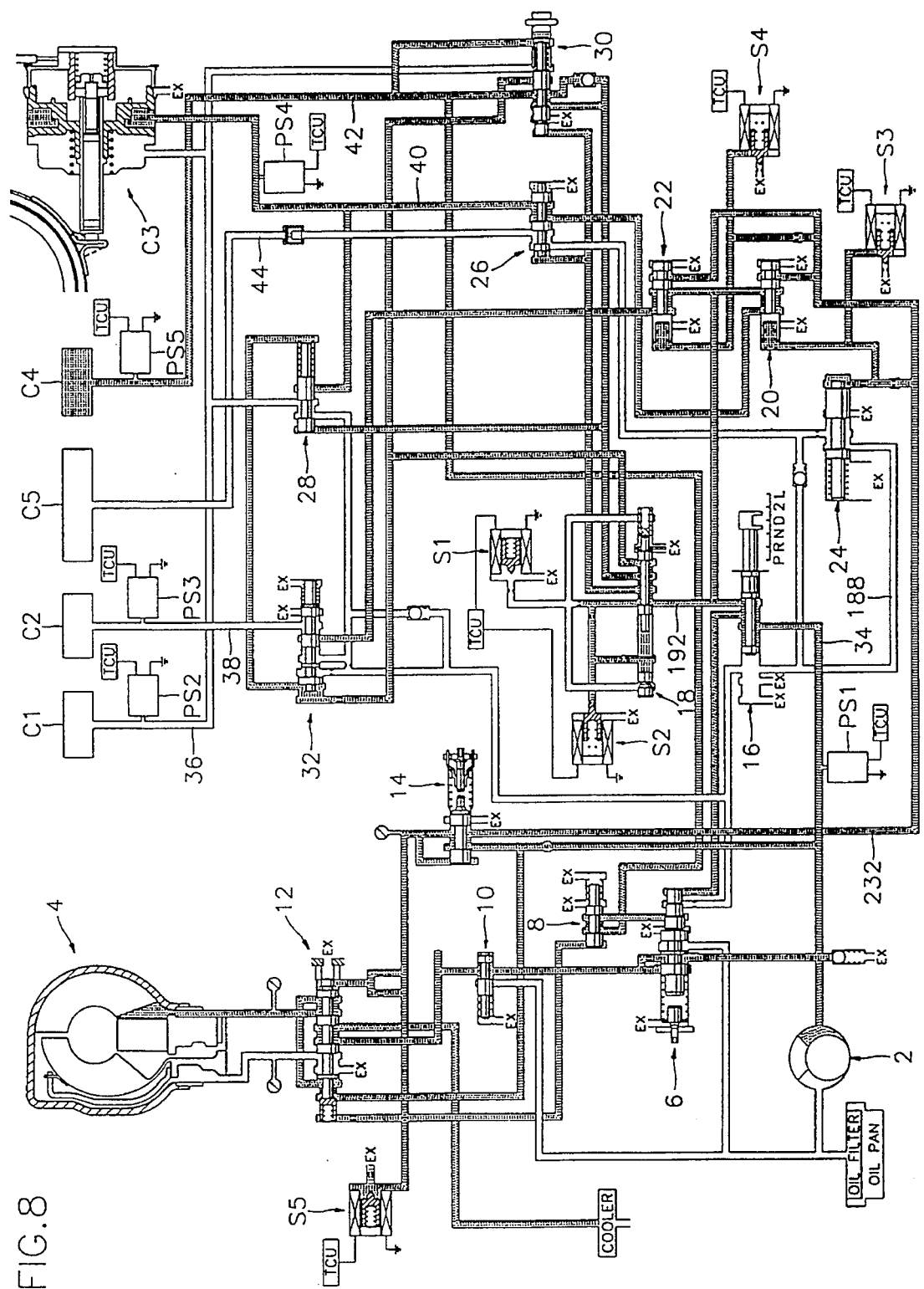
FIG. 8 is the hydraulic circuit diagram of FIG. 1 showing the operation of the electronic and hydraulic control system during the fourth speed of the "D" range.

FIG. 8 diagrams the operation of the hydraulic pressure control system during the fourth speed of the "D" range. As the vehicle speed and the throttle opening increase at the third speed, the TCU controls the first shift control solenoid valve S2 to an "ON" state and the first pressure control solenoid vale S3 according to a duty ratio, as charted in FIG. 10 as the "3-4" operation mode.

Because hydraulic pressure at the fifth and sixth ports 212 and 214 of the shift control valve 94 is released, and hydraulic pressure at the eight port 218 is not released, the valve spool 210 pushes the plug 134 and is fully displaced towards the right.

Accordingly, drive pressure is fed to the second, third and fourth speed lines 196, 198, and 200 simultaneously. In order to accomplish the fourth speed, the third and fourth friction members C3 and C4 should be applied, and the first and second friction members C1 and C2, which have been applied at the third speed, should be released.

Since application of the fourth friction member C4 is the same as that at the third speed, and application of the third friction member C3 is the same as that at the second speed, description thereof will be omitted herein.

Hydraulic pressure applied to the first friction member C1 during the third speed is directed to the fourth port 310 of the second-to-third/fourth-to-third speed shift valve 28. Some of the hydraulic pressure from the fourth speed line 200 goes through the fourth port 286 of the rear clutch exhaust valve 98. This hydraulic pressure leaves through the fifth port 288 and is fed to fifth port 314 of the second-to-third speed shift valve 28. The valve spool 312 of the second-to-third/fourth-to-second speed shift control valve 28 is then displaced towards the left such that the fourth port 310 communicates with the second port 306. The first friction member applying pressure which is stopped at the fourth port 310 and the third friction leasing pressure are fed via the reverse pressure line 58 to the manual valve 16 and returned to the oil pan through the exhaust port Ex of the manual valve 12.

Further the second friction member applying pressure is fed through the sixth port 290 to the rear clutch exhaust valve 32 and is then exhausted through the exhaust port Ex.

During theses shifting operations, damper clutch control solenoid valve S5 is controlled to ON/OFF states in accordance with the application of the damper clutch control valve to connect or disconnect torque converter 4 to the engine output shaft.

Further, the damper clutch control solenoid valve S5 controls the high-low pressure valve 12 supply such that hydraulic pressure within the fourth speed line 100 is fed to the sixth port 80 of the regulator valve 6. This hydraulic pressure with hydraulic pressure supplied to the second port 60 controls line hydraulic pressure by forcing the valve spool 50 such that when slip occurs at each friction member, the line hydraulic pressure is controlled to be increased, and after gear shifting, the line hydraulic pressure is controlled to be decreased in order to improve power train efficiency and hydraulic pump efficiency by maintaining gear shifting with the most suitable pressure.

Operation of Skip Shifting from Fourth to Second Speed

A fourth-to-second skip shifting is performed during the fourth speed of the "D" range according to the present invention. In a state shown in FIGS. 6 and 8, while application of the fourth friction member C4 is released, the second friction member C2 should be applied on the fourth-to-second skip shifting.

As the vehicle speed and the throttle opening increase significantly and abruptly while driving at the second speed, the TCU controls the first shift control solenoid valve S1 to an "OFF" sate and the second shift control solenoid valve S2 to an "ON" state, as charted in FIG. 11 as the "4-2" operation.

Also in this mode, the second pressure control solenoid valve S4 is controlled according to a duty ratio and the damper clutch control solenoid valve S5 is controlled to an "OFF" state to increase line hydraulic pressure.

Some hydraulic pressure in the drive pressure line 92 is fed via the second pressure control valve 22 to the third port 284 of the rear clutch exhaust valve 32. At this point, since hydraulic pressure in the fourth speed line 200 is obstructed, the valve spool is biased to the left by the spring 302 such that hydraulic pressure at the third port 284 is fed to the second friction member C2 through the sixth port 290.

At this point, some drive pressure is fed to the third port 252 of the first pressure control valve 20 such that the valve spool 256 of the first pressure control valve 20 is forced towards the right so as to communicate the third and fourth ports 252 and 254 with each other to feed drive pressure to the third port 328 of the first-to-second speed shift valve 26.

Hydraulic pressure from the second speed displaces the valve spool 326 of the first-to-second speed shift valve 26 towards the right. The third port 328 thus communicates with the first port 264 and hydraulic pressure is fed to the apply chamber of the third friction member C3.

Hydraulic pressure which has been applied to the fourth friction member C4 is fed to the end clutch valve 30 through the fifth port 352 as the valve spool 356 of the end clutch valve 30 is displaces towards the right. And then, some hydraulic pressure is fed via the fourth port 348 to the fourth port 208 of the shift control valve 18, and another is fed to the third port 206 through the third speed line 198.

Because the first and second shift control solenoid valves S1 and S2 are respectively controlled to "ON" and "OFF" states, the second land of the valve spool 210 is located between the second and third ports 204 and 206. Hydraulic pressure coming through the fourth and third ports 208 and 206 is exhausted through the exhaust port Ex, thereby accomplishing the second speed as shown in FIG. 6.

Reverse "R" Range Operation

Figure 9:
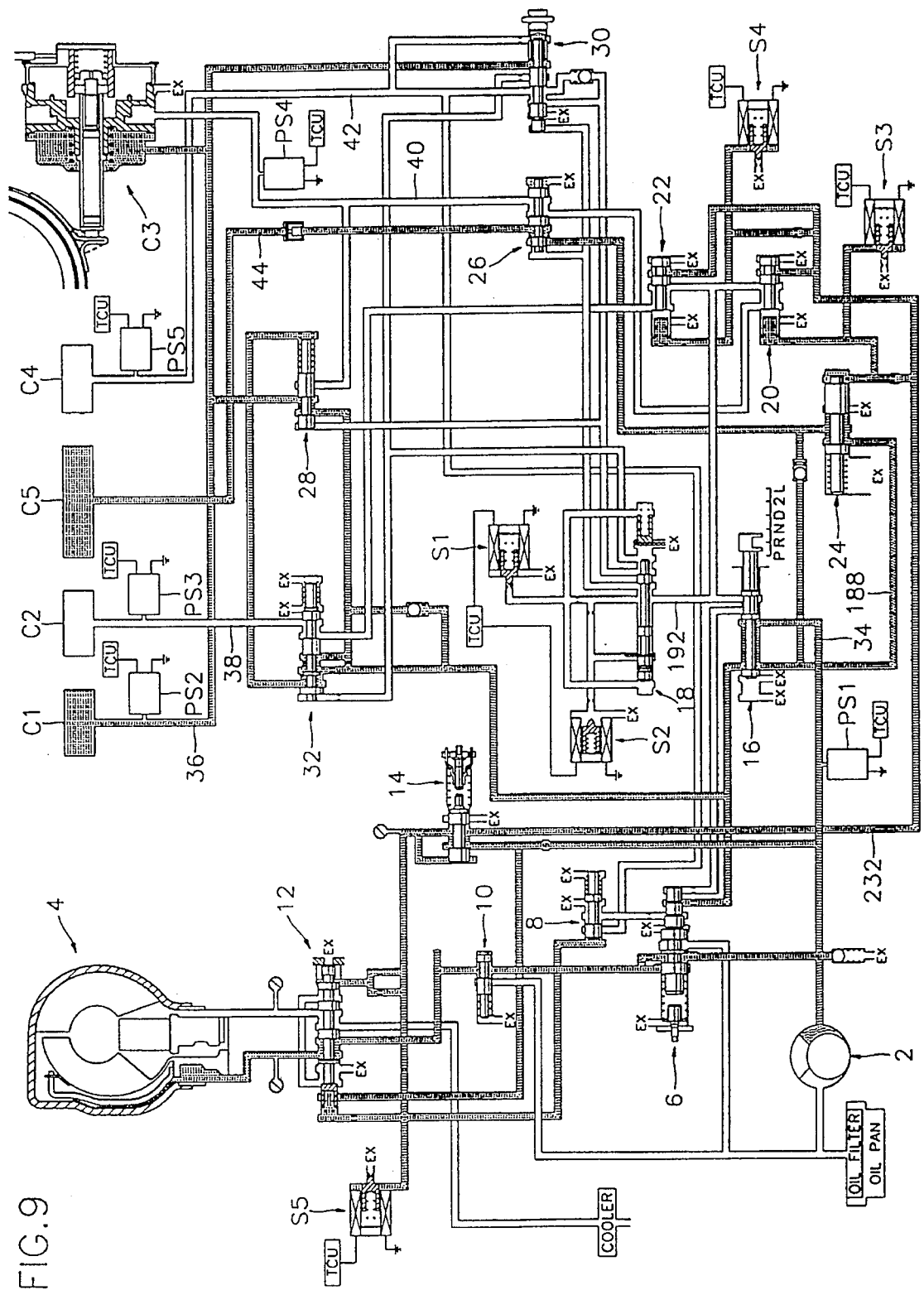
FIG. 9 is the hydraulic circuit diagram of FIG. 1 showing the operation of the control system during the "R" range.

When the shift select lever is selected to the reverse "R" range, the valve spool of the manual valve 16 is displaced to a position shown in FIG. 9. Hydraulic pressure from the hydraulic pump 4 comes through the first port 180 of the manual valve 16 and is fed via fourth port 186 to the second-to-third/fourth-to-third speed shift valve 28. Some of this hydraulic pressure is fed to the first friction member C1 and other is directed to the second port 240 of the N-R control valve 24.

Hydraulic pressure reduced in the reducing valve 14 forces the N-R control valve 24 to the left in accordance with a duty control of the first pressure control solenoid valve S3, thereby communicating the second and third ports 240 and 242 with each other. As a result, hydraulic pressure at the second port is fed to the fourth port 330 of the first-to-second speed shift valve 26 to force the valve spool 326 towards the right such that the hydraulic pressure is applied to the fifth friction member C5, thereby accomplishing the reverse mode.

As described above, in the reverse mode, hydraulic pressure is fed to the first and fifth friction members C1 and C5.

Further, the first and second shift control solenoid valves S1 and S2 are respectively controlled to "ON" and "OFF" states so as to exhaust hydraulic pressure which has been applied to each friction member at the forward mode.

In the electronic and hydraulic control system as described above, In the drive "D" neutral "N" second "2", and low "U" ranges, hydraulic pressure fed from the oil pump 2 to the manual valve 16 leaves through the third port 184 and is fed via the line hydraulic pressure line 56 to the second port 60 of the regulator valve 6. This hydraulic pressure fed to the regulator valve 6 exerts force on the sixth land 92 of the valve spool 50 to regulate line hydraulic pressure.

In the reverse "R" range, hydraulic pressure fed from the oil pump 2 to the manual valve 16 leaves through fourth port 186 and is fed via the line 58 to the third port 70 of the regulator valve. This hydraulic pressure exerts force on the fifth land 90 of the valve spool 50 to regulate line hydraulic pressure.

In the third and fourth speeds of the drive "D" range, hydraulic pressure is applied to the fourth friction member C4 via the end clutch valve 30. At this point, hydraulic pressure for third and fourth speeds stops at the third port 102 which is connected to the fourth friction member C4 by the line 100.

At this state, when the damper clutch control solenoid valve S5 is duty controlled about 50–85% by the TCU, the hydraulic pressure in the line which connects the damper clutch solenoid valve S5 to the high-low pressure valve 8 is reduced.

As a result, the valve spool 104 of the high-low pressure valve 8 is biased by the spring 110 towards the left to communicate the third and second ports 102 and 98 with each other.

Accordingly, hydraulic pressure fed to the line 100 is fed via the line 78, which connects the regulator valve 6 to the high-low pressure valve 6, to the sixth port 80 of the regulator valve 6. The hydraulic pressure fed to the sixth port exerts force on the right face of the fourth land 88 of the valve spool 50 to regulates line hydraulic pressure.

At this point, needless to say, the damper clutch is simultaneously controlled in accordance with the operation of the damper clutch control solenoid valve S5.

Accordingly, In the third and fourth speeds of the drive "D" range, since the damper clutch solenoid valve S5 reduces line hydraulic pressure, the oil pump 2 is applied with over load to significantly improve the fuel consumption ratio and, and at the same time, the operation of the damper clutch can be controlled.

Further, the electronic and hydraulic control system of the present invention, a first pressure sensor PS1 is disposed on the line hydraulic pressure line 34. When line hydraulic pressure varies in accordance with the damper clutch operation, if the line hydraulic pressure is lower than a reference hydraulic pressure which can apply the friction member, the first pressure sensor PS1 makes the line hydraulic pressure be compensated.

That is, in the third and fourth speeds of the drive "D" range where the line hydraulic pressure is variably regulated, when the line hydraulic pressure is varied to apply the damper clutch in accordance with the duty control of the damper clutch control solenoid valve S5, clutch application pressure is detected by the first pressure sensor PS1. If the detected pressure is higher than the reference hydraulic pressure, the first pressure sensor PS1 is turned "OFF" such that the damper clutch application is continued and line hydraulic pressure is variably regulated. If the detected pressure is lower than the reference hydraulic pressure, the first pressure sensor PS1 is turned "ON" to transmit this to the TCU. The damper clutch is controlled by the TCU to be released and the variation of line hydraulic pressure is stopped to change operating pressure to normal drive pressure, thereby preventing the damage of the friction member.

The first pressure sensor PS1 is a commonly used sensor that electric power is cut off when hydraulic pressure higher than the reference hydraulic pressure is applied and is introduced when hydraulic pressure lower than the reference hydraulic pressure is applied.

The operating pressure of the first pressure sensor PS1 is 6.5 kg/cm$^2$ where an electric signal is transmitted to the transmission control unit TCU.

The operating flow for compensating line hydraulic pressure will be described hereinafter more in detail.

As shown in FIG. 11, the operation flow comprises the steps of (400) determining if line hydraulic pressure detected by the first pressure sensor PS1 is higher than the reference hydraulic pressure at the first and third speeds of the drive "D" range or not, and (410) turning "OFF" the first pressure sensor PS1 if the line hydraulic pressure is lower then the reference hydraulic pressure or (420) turning "ON" the first pressure sensor PS1 if the line hydraulic pressure is lower then the reference hydraulic pressure.

The operation flow further comprises the step of (440) applying the damper clutch when the "ON" signal of the first pressure sensor PS1 is inputted to the transmission control unit TCU, thereby variably regulating line hydraulic pressure or releasing the damper clutch when the "OFF" signal of the first pressure sensor PS1 is transmitted to the transmission control unit, thereby compensating line hydraulic pressure as the variation of line hydraulic pressure is stopped.

While the conventional art controls the damper clutch operation on the basis of signals in response to a brake switch, an accelerator pedal switch, and a temperature of operation fluid, in the present invention, a signal in response to line hydraulic pressure for clutch operation is additionally inputted, such that at the third and fourth speeds of the drive "D" range requiring low power, some line hydraulic pressure is exhausted when line hydraulic pressure is higher than the reference hydraulic pressure, and is compensated to prevent the damage of the friction caused by reduced line hydraulic pressure if line hydraulic pressure is lower than the reference hydraulic pressure.

The electronic and hydraulic control system further comprises lines 36, 38, 40, and 42 connected respectively first, second, third, and fourth friction member C1, C2, C3, and C4 are respectively provided with second, third, fourth, and fifth pressure sensors PS2, PS3, PS4, and PS5. These pressure sensors detects hydraulic pressure fed to the corresponding friction member and transmits each detected pressure to the TCU.

As shown in FIG. 12, the second, third, fourth, and fifth pressure sensors PS2, PS3, PS4, and PS5 are connected to the input end of the TCU to transmit each switching signal thereto. The TCU controls the pressure control solenoid valves S3 and S4 and the damper clutch solenoid valve S5, which control the hydraulic pressure supply in each speed ratio, in response to each signal from the pressure sensors.

FIG. 14 shows an flow chart for compensating hydraulic pressure at each speed ratio according to each operation logic of the second, third, fourth, and fifth pressure sensors PS2, PS3, PS4, and PS5.

In the first step 500, the TCU reads each signal from the pressure sensors PS2, PS3, PS4, and PS5.

And then, the TCU determines if the second pressure sensor is in an "ON" state and if other pressure sensors PS3, PS4, and PS5 are in "OFF" states in the second step 510.

When the condition of the second step is satisfied, the TCU recognizes that the first speed is correctly carried out at the count "0" state.

When the condition of the second step is however not satisfied, the TCU determines if the second and third pressure sensors PS2 and PS3 are in "ON" states and if the pressure sensors PS4 and PS5 are in "OFF" states in the third step.

When the condition of the third step is satisfied, the TCU recognizes that the second speed is correctly performed at the count "0" state.

However, When the condition of the third step is not satisfied, in the fourth step, the TCU determines if all of the pressure sensors PS2, PS3, PS4, and PS5 are in "ON" states.

When the condition of the fourth step is satisfied, the TCU recognizes that the second speed is correctly performed at the count "0" state.

When the condition of the fourth step is however not satisfied, in the sixth step, the TCU determines the second, third, and fourth pressure sensors PS2, PS3, and PS4 are in "OFF" states and if the pressure sensor PS5 is in an "ON" state.

When the condition of the fifth step is satisfied, the TCU recognizes that the second speed is correctly carried out at the count "0" state.

When the condition of the fifth step is however not satisfied, above-described steps are repeated to count "10". If all conditions are not satisfied after the count "10" the TCU determines that the electronic and hydraulic control system malfunctions.

For example, if the third pressure sensor PS3 is always in an "OFF" state, this means that the first-to-second speed shift valve 26 is out of order such that the second and fourth speeds cannot be performed.

Further, if the second pressure sensor PS2 is always in an "OFF" state, this means that the rear clutch exhaust valve 32 malfunctions such than the first, second, and third speeds can not be carried out.

When hydraulic pressure is detected as described above, the TCU determines this to control each solenoid valve S3, S4 and S5 to compensate hydraulic pressure. At this point, the hydraulic compensation for the first and third friction member C1 and C3 is achieved by the second pressure control solenoid valve S4, the hydraulic compensation for the second friction member C2 by the first pressure control solenoid valve S3, and the hydraulic compensation for the fourth friction member C4 by the damper clutch control solenoid valve S5.

That is, when hydraulic pressure fed to each friction member is lower than the reference hydraulic pressure, each duty ratios of the solenoid valve is reduced to increase hydraulic pressure. On the contrary, when hydraulic pressure fed to each friction member, each duty ratio of the solenoid valves are increased to reduce hydraulic pressure.

According to this hydraulic pressure detecting method, hydraulic pressure state within the electronic and hydraulic control system is precisely detected and the signal of this detected hydraulic pressure is transmitted to the TCU such that the malfunction of the valves and the correct gear shifting stage can be determined. Further, since the hydraulic pressure state can be detected to be compensated by the control of the TCU, such that the shift quality can be improved.

As described above, in the electronic and hydraulic control system, the skip shift from the fourth to second speed is possible and line hydraulic pressure is variably controlled, the power performance and responsiveness to the gear shift can be improved.

Further, in the third and fourth speeds of the drive "D" range, since line hydraulic pressure is regularly varied, over load of the oil pump can be prevented to improve the fuel consumption ratio. Further, when line hydraulic pressure is varied simultaneously with the application of the damper clutch, the line hydraulic pressure is immediately compensated if the line hydraulic pressure is lower than the reference hydraulic pressure for applying the clutch.

Operating pressure applied to each friction member is detected so that application of each friction member is correctly determined.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. An electronic and hydraulic control system for an automatic transmission, comprising:

a hydraulic pump for pressurizing fluid;

a torque converter for transmitting power to the transmission;

a pressure regulating valve connected to the hydraulic pump for varying line hydraulic pressure according to an operation of a damper clutch control solenoid valve, the damper clutch control solenoid valve being controlled according to a duty ratio by a transmission control unit;

a high-low pressure valve for varying line hydraulic pressure of the pressure regulator valve by using hydraulic pressure fed from an end clutch, the high-low pressure valve being controlled by a duty operation of the damper clutch control solenoid valve at third and fourth speeds of a drive "D" range;

a reducing valve connected to the hydraulic pump for reducing hydraulic pressure to be lower than line hydraulic pressure;

a manual valve operated by a shift select lever for feeding pressure from the pump to selectively a drive pressure line at the drive "D" range and a reverse pressure line at a reverse "R" range;

a shift control valve connected to the drive pressure line for feeding drive pressure to each of a first and second two pressure control valves by an operation of two shift control solenoid valves which are ON/OFF controlled by the transmission control unit;

a rear clutch exhaust valve for feeding pressure from the drive pressure line to a rear clutch at first, second, and third speeds of the drive "D" range;

the first pressure control valve controlled by a first pressure control solenoid valve for feeding drive pressure from the drive pressure line to first, second, and third friction members;

the second pressure control valve controlled by a second pressure control solenoid valve according to a duty ratio in order to feed hydraulic pressure during shifting the shift select lever from a neutral "N" range to the drive "D" range, a gear shifting from a fourth speed to the third speed, and a gear skip shifting from the fourth speed to the second speed;

a first-to-second speed shift valve for feeding hydraulic pressure to third and fifth friction members in accordance with second speed line hydraulic pressure;

an end clutch valve for feeding hydraulic pressure to a fourth friction member in accordance with second speed line hydraulic pressure; and a second-to-third/fourth-to-third speed shift valve controlled by third and fourth speed line hydraulic pressures.

2. The electronic and hydraulic control system according to claim 1, wherein the high-low pressure valve communicates with a hydraulic pressure supplying line to the fourth friction member to feed hydraulic pressure to the pressure regulator valve in accordance with an operation of the damper clutch control solenoid valve, thereby varying line hydraulic pressure.

3. The electronic and hydraulic control system according to claim 1, wherein, at the first speed of the drive "D" range, the first pressure control solenoid valve is controlled to an "ON" state in order to prevent hydraulic pressure in the drive pressure line from flowing into the first-to-second speed shift valve, and the second pressure control solenoid valve is controlled to an "OFF" state in order to feed drive pressure passing through the manual valve to the second friction member via the second pressure control valve and the rear clutch exhaust valve.

4. The electronic and hydraulic control system according to claim 1, wherein the first pressure control solenoid valve is controlled to an "OFF" state at the second speed of the drive "D" range in order to feed hydraulic pressure in drive pressure line, via the first-to-second speed shift valve, to the fifth friction member to apply the fifth friction member.

5. The electronic and hydraulic control system according to claim 1, wherein the shift control valve opens a second speed line to control the first-to-second speed shift valve in order to perform a skip shift from the fourth speed to the second speed such that hydraulic pressure is fed to the second and fifth friction members and application pressure of the fourth friction member is exhausted through an exhaust port.

6. The electronic and hydraulic control system according to claim 1, wherein the regulator valve is provided with a first port communicating with the line hydraulic pressure line, second and third ports each communicating with line hydraulic pressure and reverse pressure lines and acting as reaction pressure against a regulator valve spring via the manual valve, fourth and fifth ports each communicating with the first port through a line, and a sixth port connected to the high-low valve through a line, the regulator valve comprising a valve spool, which is biased by a spring, having a first land for selectively obstructing the fourth port, a second land for permitting line hydraulic pressure to be exhausted as the valve spool moves, a third land for separating pump inhalation pressure from pilot pressure, a fourth land on which hydraulic pressure fed through the second port acts, a fifth land on which hydraulic pressure fed through the third port acts, and a sixth land on which hydraulic pressure fed through the second port acts.

7. The electronic and hydraulic control system according to claim 1, wherein the high-low pressure valve is provided with a first port communicating with a first line, a second port connected to the regulator valve, and a third port connected to the end clutch valve through a second line, the high-low pressure valve comprising a valve spool, which is biased by a spring, having a first land for selectively opening and closing the third port and a second land for selectively opening and closing an exhaust port.

8. The electronic and hydraulic control system according to claim 1, wherein the rear clutch exhaust valve is provided with first and second ports for receiving hydraulic pressure from the manual valve through the reverse pressure line at the reverse "R" range, a third port communicating with the second pressure control valve, a fourth port communicating with the fourth speed line of the shift control valve, a fifth port for controlling the second-to-third/fourth-to-third speed shift valve, and a sixth port communicating with the second friction member, the rear clutch exhaust valve comprising a valve spool having a first land, and second, third and fourth lands all of which are smaller than the first land.

9. The electronic and hydraulic control system according to claim 1, wherein the second-to-third/fourth-to-third speed shift valve is provided with a first port communicating with the third speed line of the shift control valve, a second port connected to the first and second ports of the rear clutch exhaust valve, a third port for receiving hydraulic pressure from the first-to-second speed shift valve, a fourth port for applying the first friction member and releasing the third friction member at the third speed of the drive "D" range and a fifth port connected to the fifth port of the rear clutch exhaust valve to release the first friction member at the first speed of the drive "D" range, the second-to-third/fourth-to-third speed shift valve comprising a valve spool, biased by a spring, having a first land on which hydraulic pressure within the third speed line acts and a second land for opening and closing the third port.

* * * * *

UNITED STATES PATENT AND TRADEMARK OFFICE
CERTIFICATE OF CORRECTION

PATENT NO.: 5,611,749

DATED: March 18, 1997

INVENTOR(S): Jang et al.

It is certified that an error appears in the above-identified patent and that said Letters Patent is hereby corrected as shown below:

Claim 1, Col. 18, line 34, delete "two" (first occurrence).

Signed and Sealed this

Sixteenth Day of September, 1997

*Attest:*

BRUCE LEHMAN

*Attesting Officer*

*Commissioner of Patents and Trademarks*